(12) United States Patent
Ishii et al.

(10) Patent No.: US 6,175,850 B1
(45) Date of Patent: Jan. 16, 2001

(54) SCHEME FOR CARRYING OUT MODULAR CALCULATIONS BASED ON REDUNDANT BINARY CALCULATION

(75) Inventors: Shinji Ishii; Kiyoto Tanaka; Katsuichi Oyama, all of Kanagawa-ken (JP)

(73) Assignee: Nippon Telegraph and Telephone Corporation, Tokyo (JP)

( * ) Notice: Under 35 U.S.C. 154(b), the term of this patent shall be extended for 0 days.

(21) Appl. No.: 09/017,520

(22) Filed: Feb. 2, 1998

(30) Foreign Application Priority Data

Feb. 3, 1997 (JP) .................................................. 9-020607
Mar. 5, 1997 (JP) .................................................. 9-050473

(51) Int. Cl.[7] .................................................. G06F 7/38
(52) U.S. Cl. .......................................... 708/491; 708/650
(58) Field of Search ................... 708/491, 492, 708/650, 653, 654, 655, 656

(56) References Cited

U.S. PATENT DOCUMENTS

| | | | |
|---|---|---|---|
| 4,951,238 | * | 8/1990 | Sasahara ............................. 708/440 |
| 5,381,423 | * | 1/1995 | Turco .................................. 714/762 |
| 5,644,524 | * | 7/1997 | Aken et al. .......................... 708/655 |

FOREIGN PATENT DOCUMENTS 8-147266    6/1996 (JP) .

OTHER PUBLICATIONS

Ishii et al., "A Single–Chip RSA Processor Implemented in a 0.5 μm Rule Gate Array", Seventh Annual IEEE International ASIC Conference and Exhibit.

Avizienis, A., "Signed–Digit Number Representations for Fast Parallel Arithmetic", IRE Transactions of Electronic Computers, pp. 389–400, Sep., 1961.

Kocher, P. C., "Timing Attacks on Implementations of Diffie–Hellman, RSA, DDS, and Other Systems", Advances in Cryptology —CRYPTO '96, pp. 104–113, 1996.

Vandemeulebroecke et al., "A New Carry–Free Division Algorithm and its Application to a Single–Chip 1024–b RSA Processor", IEEE Journal of Solid–State Circuits, vol. 25, No. 3, Jun. 1990.

* cited by examiner

*Primary Examiner*—Ohuong Dinh Ngo
(74) *Attorney, Agent, or Firm*—Kilpatrick Stockton LLP

(57) ABSTRACT

A scheme for carrying out modular calculations which is capable of carrying out modular calculations using redundant binary calculation even when a number of bits of the mantissa (dividend) is larger than a number of bits of the modulus (divisor). In this scheme, the divisor c in the divisor register is left shifted by (i−j) digits when a number of digits j of the divisor c is less than a number of digits i that can be stored in the divisor register, and the modular reduction a mod c is calculated up to (i−j)-th decimal place using the dividend a and the left shifted divisor c. Alternatively, the divisor c given in h-ary notation in the divisor register is left shifted by (i−j) digits when a number of digits j of the divisor c is less than a number of digits i that can be stored in the divisor register, while the dividend a given in h-ary notation in the dividend register is left shifted by (k−l) digits when a number of digits l of the dividend a is less than a number of digits k that can be stored in the dividend register, where $k \geq i$. Then, the modular reduction a mod c is calculated up to a digit of [(k−l)−(i−j)]-th power of h using the left shifted dividend a and the left shifted divisor c to obtain a remainder, and this remainder is right shifted by (k−l) digits.

63 Claims, 8 Drawing Sheets

CARRYING BY TWO DIGITS 201

OBTAINING REMAINDER 203

CALCULATING UP TO 2ND DECIMAL PLACE 202

CARRYING BY ONE DIGIT 212

RIGHT SHIFTING BY ONE DIGIT 214

CARRYING BY TWO DIGITS 211

CALCULATING UP TO 1ST DECIMAL PLACE 213

SCHEME FOR CARRYING OUT MODULAR CALCULATIONS BASED ON REDUNDANT BINARY CALCULATION

BACKGROUND OF THE INVENTION

1. Field of the Invention

The present invention relates to a scheme for carrying out modular calculations, especially modular exponentiation calculations, which are necessary for basic operations and key generation in public key cryptosystems such as RSA cryptosystem.

2. Description of the Background Art

Basic operations and key generation in public key cryptosystems such as RSA cryptosystem require modular calculations such as modular exponentiation $a^b$ mod c, modular multiplication a×b mod c, and modular reduction a mod c. In addition, application protocols utilizing public key cryptosystems often utilize these modular calculations in combination. Consequently one frequently encounters cases where some modular calculation result is to be used in next calculation. In view of this fact, there has been a proposition of a calculation scheme using redundant binary calculation, as disclosed in A. Vandemeulebroecke, et al.: "A New Carry-Free Division Algorithm and its Application to a Single-Chip 1024-b RSA Processor", IEEE Journal of Solid-State Circuits, Vol. 25, No. 3, pp. 748–756, June 1990.

However, this conventional scheme has been associated with the problem that modular exponentiation $a^b$ mod c and modular reduction a mod c cannot be calculated when |a|>|c|. In the following description, |k| will be referred to as a number of bits of k, and a, b and c appearing in modular exponentiation $a^b$ mod c will be referred to as mantissa (dividend), exponent, and modulus (divisor), respectively.

In principle, the redundant binary calculation requires the most significant bit of a divisor in binary expression to be "1" in a case of division, so that there has been a limitation that a number of bits of a divisor of a designed division circuit must coincide with a number of bits of a divisor to be used in calculation.

In this regard, there has been a proposition disclosed in Japanese Patent Application Laid Open No. 8-147266 (1996) for removing this limitation on a number of bits of a modulus by the following provisions.

(1) An entire divisor (modulus) is left shifted until the most significant bit of a divisor (modulus) becomes "1".

(2) An entire dividend (mantissa) is also left shifted as much as a shifting made in (1).

(3) A calculation is carried out by the conventional redundant binary calculation.

(4) A calculation result is right shifted as much as a shifting made in (1) in order to correct the calculation result.

However, since the mantissa is to be right shifted for the same number of bits as the modulus in (2), there has been a problem that an accurate calculation becomes impossible when a number of bits of the mantissa is larger than a number of bits of the modulus because of the overflow.

Under such condition, when an application of this proposition to LSI is considered, there is no problem when the mantissa is set to be smaller than the modulus in advance, but it is rather inconvenient for applications to various application programs. For example, in a case of modular multiplication a×b mod c, one usually has a<c and b<c but a product a×b becomes larger than c in general so that this calculation cannot be carried out by this proposition.

Now, the modular exponentiation is frequently utilized as basic operations in public key cryptosystems. For example, in RSA cryptosystem, modular exponentiation using a secret exponent is to be carried out in the decryption operation and the signing operation.

Conventionally, almost all public key cryptosystems utilize modular exponentiation, which can be expressed as $a^b$ mod c. In the signing operation or the decryption operation, at least one of the three parameters involved in modular exponentiation is to be kept secret.

However, when three parameters are exactly the same, an identical result will be obtained obviously. On the other hand, in a case of carrying out modular exponentiation using a dedicated processor, an identical calculation result is always obtained when an environment such as operation frequency is constant. Then, there is a report which points out that a secret key can be obtained by utilizing these features, as disclosed in P. C. Kocher: "Timing Attacks on Implementations of Diffie-Hellman, RSA, DSS, and Other Systems", Advances in Cryptology—CRYPTO'96, Lecture Notes in Computer Science 1109, pp. 104–113, Springer-Verlag.

This method (called timing attack) is somewhat time consuming and not very easy, but still far easier than a method for deriving a secret key by utilizing mathematical features or a method for carrying out the extensive search of a secret key. This method becomes more dangerous in an environment in which the time can be measured more accurately. Moreover, this method becomes more dangerous when a number of parallel jobs is fewer.

Thus, the secret key calculation utilizing modular exponentiation and the like has the same amount of calculations for exactly the same parameters, and there are cases where this feature can be maliciously utilized to obtain a secret key.

SUMMARY OF THE INVENTION

It is therefore an object of the present invention to provide a scheme for carrying out modular calculations which is capable of carrying out modular calculations using redundant binary calculation even when a number of bits of the mantissa is larger than a number of bits of the modulus.

It is another object of the present invention to provide a scheme for calculating modular exponentiation capable of preventing the timing attack for obtaining a secret key by utilizing the same parameters, which is a known attacking method for the public key cryptosystem using modular exponentiation by a dedicated processor.

According to one aspect of the present invention there is provided a method for carrying out modular calculations based on a redundant binary calculation scheme, including a modular reduction a mod c where a is a dividend and c is a divisor, comprising the steps of: (a) registering the dividend a and the divisor c in a dividend register and a divisor register, respectively; (b) left shifting the divisor c in the divisor register by (i−j) digits when a number of digits j of the divisor c is less than a number of digits i that can be stored in the divisor register; and (c) calculating the modular reduction a mod c up to (i−j)-th decimal place using the dividend a in the dividend register and the divisor c in the divisor register as left shifted by the step (b), to obtain a remainder as a modular reduction result.

According to another aspect of the present invention there is provided a method for carrying out modular calculations based on a redundant binary calculation scheme, including a modular reduction a mod c where a is a dividend given in h-ary notation and c is a divisor given in h-ary notation, comprising the steps of: (a) registering the dividend a and the divisor c in a dividend register and a divisor register, respectively; (b) left shifting the divisor c in the divisor register by (i−j) digits when a number of digits j of the divisor c is less than a number of digits i that can be stored in the divisor register; (c) left shifting the dividend a in the dividend register by (k−l) digits when a number of digits l of the dividend a is less than a number of digits k that can be stored in the dividend register, where $k \geq i$; (d) calculating the modular reduction a mod c up to a digit of [(k−l)−(i−j)]-th power of h using the dividend a in the dividend register as left shifted by the step (c) and the divisor c in the divisor register as left shifted by the step (b), to obtain a remainder; and (e) right shifting the remainder obtained by the step (d) by (k−l) digits, to obtain a modular reduction result.

According to another aspect of the present invention there is provided a method for carrying out modular calculations based on a redundant binary calculation scheme, including a modular multiplication a×b mod c where a and b are dividends and c is a divisor, comprises the steps of: (a) obtaining a first modular reduction a'=a mod c by: (aa) registering the dividend a and the divisor c in a first dividend register and a second divisor register, respectively; (ab) left shifting the divisor c in the first divisor register by (i−j) digits when a number of digits j of the divisor c is less than a number of digits i that can be stored in the first divisor register; and (ac) calculating the first modular reduction a'=a mod c up to (i−j)-th decimal place using the dividend a in the first dividend register and the divisor c in the first divisor register as left shifted by the step (ab), to obtain a remainder as a modular reduction result; (b) obtaining a second modular reduction b'=b mod c by: (ba) registering the dividend b and the divisor c given in h-ary notation in a second dividend register and a second divisor register, respectively; (bb) left shifting the divisor c in the second divisor register by (m−n) digits when a number of digits n of the divisor c is less than a number of digits m that can be stored in the second divisor register; (bc) left shifting the dividend b in the second dividend register by (k−l) digits when a number of digits l of the dividend b is less than a number of digits k that can be stored in the dividend register, where $k \geq m$; (bd) calculating the second modular reduction a'=a mod c up to a digit of [(k−l)−(m−n)]-th power of h using the dividend b in the second dividend register as left shifted by the step (bc) and the divisor c in the second divisor register as left shifted by the step (bb), to obtain a remainder; and (be) right shifting the remainder obtained by the step (bd) by (k−l) digits, to obtain a modular reduction result; and (c) calculating a modular multiplication a'×b' mod c using a' obtained by the step (a) and b' obtained by the step (b), to obtain a modular multiplication result.

According to another aspect of the present invention there is provided a device for carrying out modular calculations based on a redundant binary calculation scheme, including a modular reduction a mod c where a is a dividend and c is a divisor, comprising: a dividend register for registering the dividend a; a divisor register for registering the divisor c; a shifting unit for left shifting the divisor c in the divisor register by (i−j) digits when a number of digits j of the divisor c is less than a number of digits i that can be stored in the divisor register; and a calculation unit for calculating the modular reduction a mod c up to (i−j)-th decimal place using the dividend a in the dividend register and the divisor c in the divisor register as left shifted by the shifting unit, to obtain a remainder as a modular reduction result.

According to another aspect of the present invention there is provided a device for carrying out modular calculations based on a redundant binary calculation scheme, including a modular reduction a mod c where a is a dividend given in h-ary notation and c is a divisor given in h-ary notation, comprising: a dividend register for registering the dividend a; a divisor register for registering the divisor c; a divisor shifting unit for left shifting the divisor c in the divisor register by (i−j) digits when a number of digits j of the divisor c is less than a number of digits i that can be stored in the divisor register; a dividend shifting unit for left shifting the dividend a in the dividend register by (k−l) digits when a number of digits l of the dividend a is less than a number of digits k that can be stored in the dividend register, where $k \geq i$; a calculation unit for calculating the modular reduction a mod c up to a digit of [(k−l)−(i−j)]-th power of h using the dividend a in the dividend register as left shifted by the dividend shifting unit and the divisor c in the divisor register as left shifted by the divisor shifting unit, to obtain a remainder; and a remainder shifting unit for right shifting the remainder obtained by the calculation unit by (k−l) digits, to obtain a modular reduction result.

According to another aspect of the present invention there is provided a device for carrying out modular calculations based on a redundant binary calculation scheme, including a a modular multiplication a×b mod c where a and b are dividends and c is a divisor, comprising: a first modular reduction calculation unit including: a first dividend register for registering the dividend a; a first divisor register for registering the divisor c; a shifting unit for left shifting the divisor c in the first divisor register by (i−j) digits when a number of digits j of the divisor c is less than a number of digits i that can be stored in the first divisor register; and a first calculation unit for calculating a first modular reduction a'=a mod c up to (i−j)-th decimal place using the dividend a in the first dividend register and the divisor c in the first divisor register as left shifted by the shifting unit, to obtain a remainder as a modular reduction result; a second modular reduction calculation unit including: a second dividend register for registering the dividend b given in h-ary notation; a second divisor register for registering the divisor c given in h-ary notation; a divisor shifting unit for left shifting the divisor c in the second divisor register by (m−n) digits when a number of digits n of the divisor c is less than a number of digits m that can be stored in the second divisor register; a dividend shifting unit for left shifting the dividend b in the second dividend register by (k−l) digits when a number of digits l of the dividend b is less than a number of digits k that can be stored in the second dividend register, where $k \geq m$; a second calculation unit for calculating a second modular reduction b'=b mod c up to a digit of [(k−l)−(m−n)]-th power of h using the dividend b in the second dividend register as left shifted by the dividend shifting unit and the divisor c in the second divisor register as left shifted by the divisor shifting unit, to obtain a remainder; and a remainder shifting unit for right shifting the remainder obtained by the second calculation unit by (k−l) digits, to obtain a modular reduction result; and a modular multiplication calculation unit for calculating a modular multiplication a'×b' mod c to obtain a modular multiplication result.

According to another aspect of the present invention there is provided an article of manufacture, comprising: a computer usable medium having computer readable program code means embodied therein for causing a computer to function as a system for carrying out modular calculations based on a redundant binary calculation scheme, including a modular reduction a mod c where a is a dividend and c is a divisor, the computer readable program code means including: first computer readable program code means for causing said computer to registering the dividend a and the divisor c in a dividend register and a divisor register, respectively; second computer readable program code means for causing said computer to left shift the divisor c in the divisor register by (i−j) digits when a number of digits j of the divisor c is less than a number of digits i that can be stored in the divisor register; and third computer readable program code means for causing said computer to calculate the modular reduction a mod c up to (i−j)-th decimal place using the dividend a in the dividend register and the divisor c in the divisor register as left shifted by the second computer readable program code means, to obtain a remainder as a modular reduction result.

According to another aspect of the present invention there is provided an article of manufacture, comprising: a computer usable medium having computer readable program code means embodied therein for causing a computer to function as a system for carrying out modular calculations based on a redundant binary calculation scheme, including a modular reduction a mod c where a is a dividend given in h-ary notation and c is a divisor given in h-ary notation, the computer readable program code means including: first computer readable program code means for causing said computer to registering the dividend a and the divisor c in a dividend register and a divisor register, respectively; second computer readable program code means for causing said computer to left shift the divisor c in the divisor register by (i−j) digits when a number of digits j of the divisor c is less than a number of digits i that can be stored in the divisor register; third computer readable program code means for causing said computer to left shift the dividend a in the dividend register by (k−l) digits when a number of digits l of the dividend a is less than a number of digits k that can be stored in the dividend register, where $k \geq i$; fourth computer readable program code means for causing said computer to calculate the modular reduction a mod c up to a digit of $[(k-l)-(i-j)]$-th power of h using the dividend a in the dividend register as left shifted by the third computer readable program code means and the divisor c in the divisor register as left shifted by the second computer readable program code means, to obtain a remainder; and fifth computer readable program code means for causing said computer to right shift the remainder obtained by the fourth computer readable program code means by (k−l) digits, to obtain a modular reduction result.

According to another aspect of the present invention there is provided an article of manufacture, comprising: a computer usable medium having computer readable program code means embodied therein for causing a computer to function as a system for carrying out modular calculations based on a redundant binary calculation scheme, including a modular multiplication a×b mod c where a and b are dividends and c is a divisor, the computer readable program code means including: a first computer readable program code means for causing said computer to obtain a first modular reduction a'=a mod c by: registering the dividend a and the divisor c in a first dividend register and a first divisor register, respectively; left shifting the divisor c in the first divisor register by (i−j) digits when a number of digits j of the divisor c is less than a number of digits i that can be stored in the first divisor register; and calculating a first modular reduction a mod c up to (i−j)-th decimal place using the dividend a in the first dividend register and the divisor c in the first divisor register as left shifted, to obtain a remainder as a modular reduction result; a second computer readable program code means for causing said computer to obtain a second modular reduction by: registering the dividend b and the divisor c given in h-ary notation in a second dividend register and a second divisor register, respectively; left shifting the divisor c in the second divisor register by (m−n) digits when a number of digits n of the divisor c is less than a number of digits m that can be stored in the second divisor register; left shifting the dividend b in the second dividend register by (k−l) digits when a number of digits l of the dividend a is less than a number of digits k that can be stored in the second dividend register, where $k \geq m$; calculating a second modular reduction b'=b mod c up to a digit of $[(k-l)-(m-n)]$-th power of h using the dividend b in the second dividend register as left shifted and the divisor c in the second divisor register as left shifted, to obtain a remainder; and right shifting the remainder by (k−l) digits, to obtain a modular reduction result; and a third computer readable program code means for causing said computer to calculate a modular multiplication a'×b' mod c to obtain a modular multiplication result.

Other features and advantages of the present invention will become apparent from the following description taken in conjunction with the accompanying drawings.

BRIEF DESCRIPTION OF THE DRAWINGS

FIGS. 3A, 3B and 3C are diagrams showing exemplary modular calculations carried out by the modular calculation device of FIG. 1.

DETAILED DESCRIPTION OF THE PREFERRED EMBODIMENTS

Referring now to FIG. 1 to FIG. 4, the first embodiment of a scheme for carrying out modular calculations according to the present invention will be described in detail.

Figure 1:
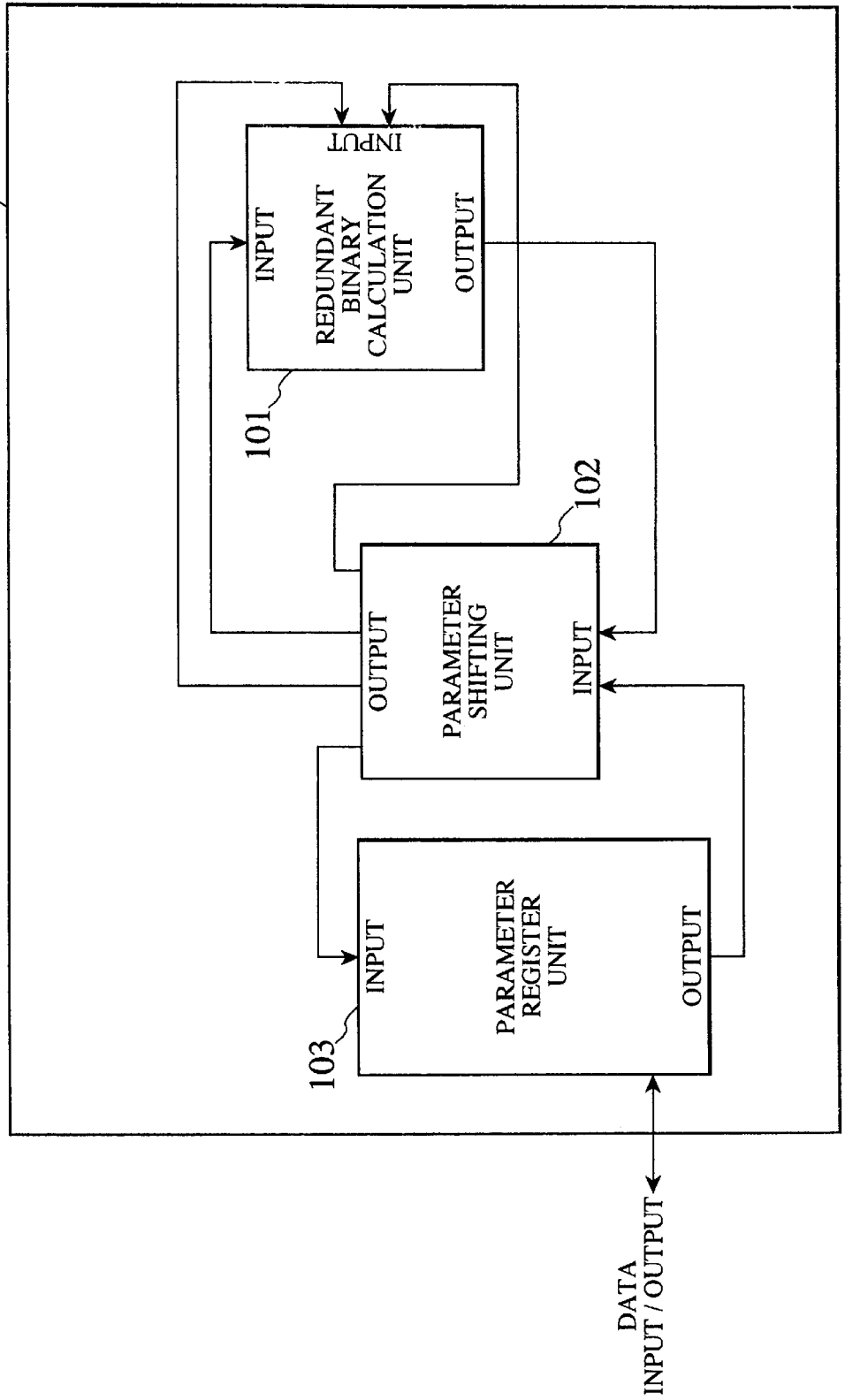
FIG. 1 is a block diagram of a modular calculation device according to the first embodiment of the present invention.

FIG. 1 shows a configuration of a modular calculation device 100 in this first embodiment, which comprises a redundant binary calculation unit 101, a parameter shifting unit 102, and a parameter register unit 103 made of general purpose registers. This modular calculation device 100 can be realized most conveniently by a single-chip LSI.

The redundant binary calculation unit 101 carries out the redundant binary calculation. Parameter input and output ports of the redundant binary calculation unit 101 are connected with the parameter shifting unit 102. Also, the parameter register unit 103 is a register for the purpose of storing parameters used in the parameter shifting unit 102, and functions as data input/output interface between internal bus and external bus of the modular calculation device 100.

Figure 2:
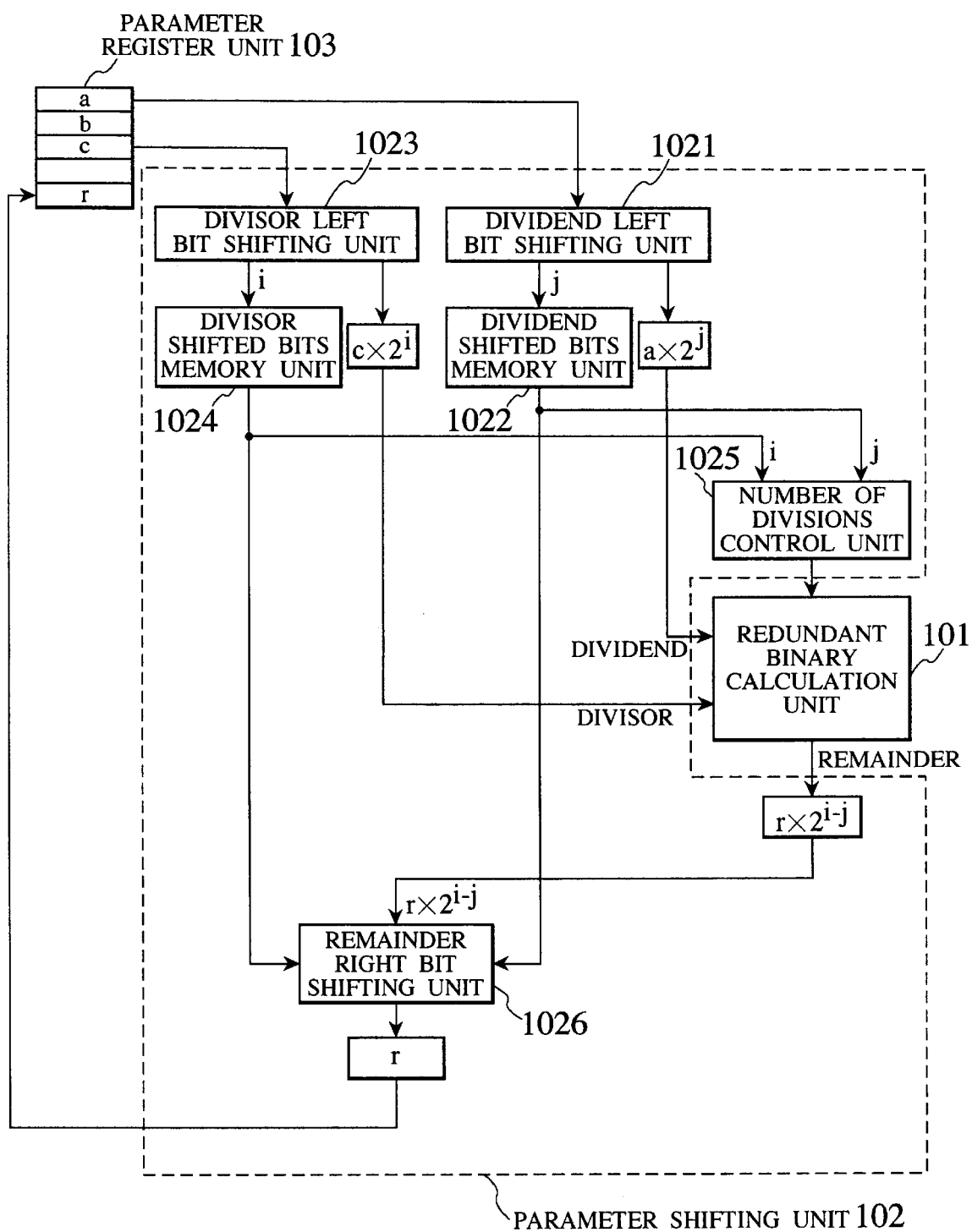
FIG. 2 is a block diagram showing an internal configuration of a parameter shifting unit in the modular calculation device of FIG. 1.

In further detail, the parameter shifting unit 102 has an internal configuration as shown in FIG. 2, which comprises: a dividend left bit shifting unit 1021 for left bit shifting a dividend a to yield $a \times 2^j$ to be supplied to the redundant binary calculation unit 101 as a dividend; a dividend shifted bits memory unit 1022 for storing a shifted bits j by which the dividend a is bit shifted by the dividend left bit shifting unit 1021; a divisor left bit shifting unit 1023 for left bit shifting a divisor c to yield $c \times 2^i$ to be supplied to the redundant binary calculation unit 101 as a divisor; a divisor shifted bits memory unit 1024 for storing a shifted bits i by which the divisor c is bit shifted by the divisor left bit shifting unit 1023; a number of divisions control unit 1025 for controlling the redundant binary calculation unit 101 to carry out additional divisions for (i−j) times according to i and j stored in the dividend shifted bits memory unit 1022 and the divisor shifted bits memory unit 1024; and a remainder right bit shifting unit 1026 for right bit shifting a remainder $r \times 2^{i-j}$ obtained by the redundant binary calculation unit 101 according to i and j stored in the dividend shifted bits memory unit 1022 and the divisor shifted bits memory unit 1024 to yield a remainder r to be supplied to the parameter register unit 103 as a calculated remainder.

Now, the operation in this modular calculation device 100 of FIG. 1 will be described for different types of modular calculations separately.

a mod c

As a simplest example, a case of modular reduction a mod c will be described first.

From the limitation in a case of division, the calculation cannot be carried out unless a number of bits of a modulus is equal to a bit length k of a register of the modulus c at a time of designing a redundant binary calculation circuit. In other words, the calculation cannot be carried out unless the most significant bit of a register of the modulus c is "1".

For this reason, according to the conventional proposition, this limitation is compensated by utilizing:

$$a \bmod c = \{(a \times 2^i) \bmod (c \times 2^i)\}/2^i \qquad (1)$$

and setting $c \times 2^i$ equal to k so as to convert modulus into the same number of bits as a register for storing the modulus c.

In a case of general purpose register configuration, it is customary to use registers of the same bit length for the purpose of storing a and c.

Also, the modular calculation on the right hand side of the above equation (1) makes sense when a>c, but as can be seen from the left hand side of the above equation (1), the mantissa is also to be multiplied by $2^i$, so that when a mantissa register is set to have the same number of bits as a modulus register, the above equation (1) can be actually utilized only when the following conditions (2) and (3) both hold simultaneously:

$$a > c \qquad (2)$$

$$|a| = |c| \qquad (3)$$

which is a severely limited condition.

In view of this, this first embodiment removes the condition (3) and makes it possible to carry out modular calculation as long as a and c are within bit lengths of respective registers even when $$|a| \geq |c| \qquad (4)$$

For the sake of ease of comprehension, an exemplary case of using decimal numbers is shown in FIGS. 3A, 3B and 3C.

The ordinary division can be expressed as shown in FIG. 3A, where a division of 243/13=18 with a remainder 9 is calculated.

Now, suppose that each one of a divisor register and a dividend register has four digits in decimal expression. Then, suppose that the most significant digit of the divisor register must be non-zero. Under this condition, the calculation can be realized by the following two methods.

Method 1 (FIG. 3B)

Step 1: By carrying (left shifting) the divisor by two digits, the most significant digit in the divisor register becomes non-zero.

13→1300 (201 of FIG. 3B)

Step 2: In calculating 243/1300, the calculation is carried out up to the second decimal place, as much as two digits by which the divisor is carried in Step 1.

243/1300=0.18 with remainder 9 (202 of FIG. 3B)

Step 3: The remainder 9 is obtained (203 of FIG. 3B).

Method 2 (FIG. 3C)

Step 1: By carrying (left shifting) the divisor by two digits, the most significant digit in the divisor register becomes non-zero.

13→1300 (211 of FIG. 3C)

Step 2: By carrying (left shifting) the dividend by one digit so that the most significant digit in the dividend register becomes non-zero, similarly as in the case of the divisor register.

243→2430 (212 of FIG. 3C)

Step 3: In calculating 2430/1300, the calculation is carried out up to the first decimal place, as much as 2−1=1 digit by which the carrying is made in Step 1 and Step 2.

2430/1300=1.8 with remainder 90 (213 of FIG. 3C)

Step 4: The remainder is right shifted by one digit, as much as the carrying is made in Step 3.

90→9 (214 of FIG. 3C)

This Method 2 can be stated with more generality as follows. Namely, in a case where the dividend a and the divisor c are given in h-ary notation and the divisor c in the divisor register is left shifted by (i−j) digits when a number of digits j of the divisor c is less than a number of digits i that can be stored in the divisor register while the dividend a in the dividend register is left shifted by (k−l) digits when a number of digits l of the dividend a is less than a number of digits k that can be stored in the dividend register, where k≧i, the calculation of modular reduction a mod c is carried out up to a digit of [(k−l)−(j−l)]-th power of h using the left shifted dividend a in the dividend register and the left shifted divisor c in the divisor register to obtain a remainder, and then the obtained remainder is right shifted by (k−l) digits, to obtain a modular reduction result. Stated this way, Method 2 is valid even when l>i.

When Method 1 and Method 2 are compared, Method 1 requires fewer steps. On the other hand, when Step 2 of Method 1 and Step 3 of Method 2 are compared, a number of divisions is fewer in Method 2. Consequently, which method can carry out the calculation faster depends on a circuit configuration.

In general, a digit shift of data bus width (plural digits) and one division (one digit unit) require the same number of clocks so that Method 2 using digit shift is more efficient.

When these two methods are extended into binary numbers, they are applicable to redundant binary numbers. As a result, it becomes possible to carry out the calculation even when $|a| \geq |c|$.

a×b mod c

Next, a case of modular multiplication a×b mod c will be described, For modular multiplication, the basic redundant binary calculation circuit can be used when $$a<c, \ b<c \qquad (5)$$

but modular multiplication cannot be carried out directly when $$|a\times b|<|c| \qquad (6)$$

For this reason, the calculation is carried out by the following steps.

Step 1: Input a and c, and reduce mantissa a into a'=a mod c which is less than or equal to the modulus c, using a method of modular reduction described above.

Step 2: Input b, and reduce mantissa b into b'=b mod c which is less than or equal to the modulus c, using a method of modular reduction described above.

Step 3: Carry out modular multiplication a'×b' mod c. In other words, the following relationship is utilized here.

$$(a\times b) \bmod c = \{(a \bmod c)\times(b \bmod c)\} \bmod c = (a'\times b') \bmod c$$

By this provision, as long as each parameter has a number of bits less than or equal to a number of bits that can be stored in its register, it is possible to carry out modular multiplication regardless of sizes of parameters.

It is to be noted that, in realizing this modular multiplication, both of the modular reduction a'=a mod c and the modular reduction b'=b mod c can be carried out by Method 1 or Method 2 described above, but it is also possible to carry out one of them by Method 1 and another one of them by Method 2. In some cases, such a mixed use of Method 1 and Method 2 can realize a faster calculation.

$a^x$ mod c

Next, a case of modular exponentiation $a^x$ mod c will be described. Modular exponentiation can be realized by iterations of modular multiplication a×b mod c so that modular exponentiation can be calculated by a redundant binary calculation circuit.

Thus a case of modular exponentiation can be reduced to modular multiplications.

Application to Binary Calculation

Figure 4:
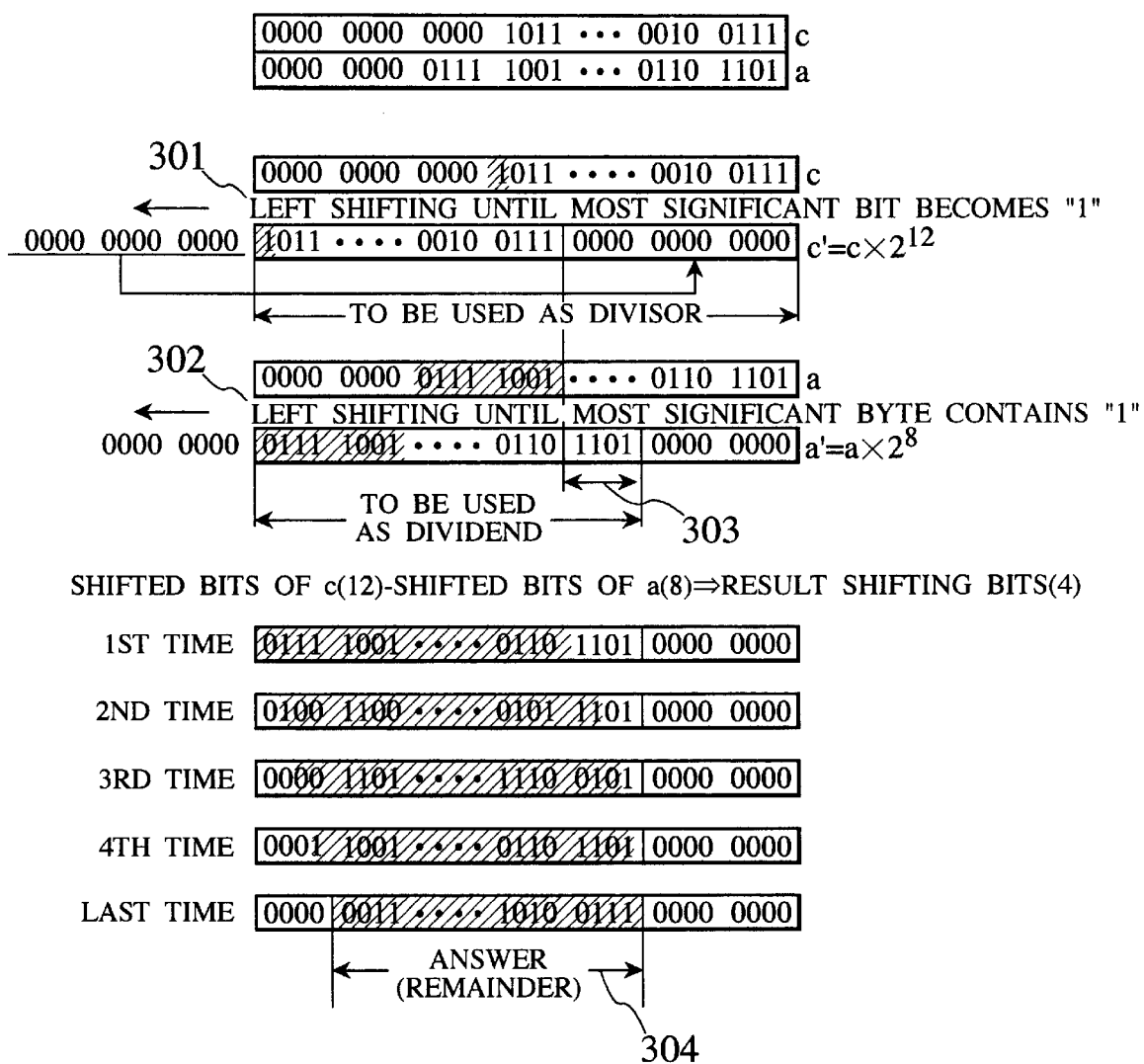
FIG. 4 is a diagram showing an exemplary modular calculation on according to a redundant binary calculation scheme carried out by the modular calculation device of FIG. 1.

FIG. 4 shows a concrete example in a case of applying a scheme of this first embodiment to binary numbers.

In FIG. 4, the modulus c is bit shifted up to the most significant bit of a register for the modulus c to yield c' (301 of FIG. 4 where c is bit shifted by 12 bits). Next, a mantissa a is byte shifted until the most significant byte of a register of the mantissa a contains "1" to yield a' (302 of FIG. 4 where a is byte shifted by 2 bytes). In this manner, it becomes possible to apply the redundant binary calculation.

Then, a division is started. Here, however, the last bit for carrying out division is set to be as many bits from the most significant bit of the modulus as a difference between shifted bits of the modulus and the mantissa (303 of FIG. 4 where the difference is four bits). Thus, the answer, i.e. a remainder, becomes 304 as indicated in FIG. 4.

As described, this first embodiment takes full advantage of fast calculation due to the use of the redundant binary calculation, while removing the limitation on a number of bits of the modulus which is the disadvantage of the redundant binary calculation.

Referring now to FIG. 5 to FIG. 8, the second embodiment of a scheme for carrying out modular calculations according to the present invention will be described in detail. This second embodiment is directed to a case of calculating modular exponentiation.

Figure 5:
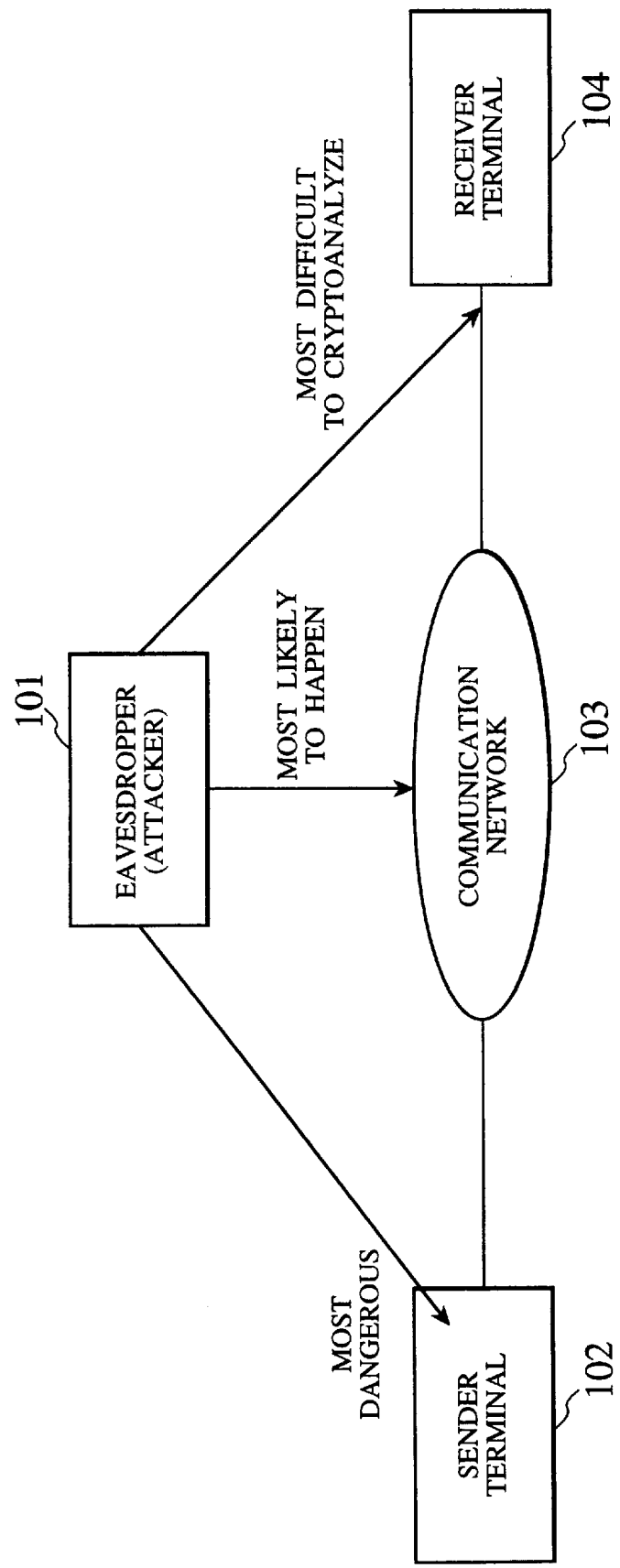
FIG. 5 is a schematic block diagram showing exemplary cases of timing attacks that can occur in a typical communication system.

First, FIG. 5 shows an exemplary case where a sender terminal 102 carries out the signing operation and sends the operation result toward a receiver terminal 104 through a communication network 103, and an eavesdropper (attacker) 101 attempts to guess a secret key by monitoring and cryptoanalyzing the communication.

In this case, places where the cryptoanalysis can take place are a vicinity of the sender terminal 102, the communication network 103, and a vicinity of the receiver terminal 104, in decreasing order of ease of the cryptoanalysis (that is, decreasing order of danger of being eavesdropped). The biggest reason for this is that less contribution from the processing related to the communication is involved at a place nearer to the sender terminal 102. On the other hand, the easiest place to monitor the communication is a portion of the communication network (public network) 103.

Now, consider the following case in which the cryptoanalysis is easiest. Namely, suppose that a dedicated processor for modular exponentiation is provided at the sender terminal 102 and it is possible to obtain a processing time, a public information such as public key, and a processing result for that processor. The object of the eavesdropper 101 then is to store a plurality of these results and guess a secret key used in that processing.

The main reason why this is the case where the cryptoanalysis is easiest is that the same processing time is taken for the same input and there is hardly any influence on the other processing because of the use of the dedicated processor.

In view of this, this second embodiment is directed to a case of using such a dedicated processor, where either a circuit having an uncertain delay time is provided within the processor or a random delay time is given from external so that the processing time becomes different at different occasions of processing even for the same input, thereby effectively preventing the timing attacks.

Figure 6:
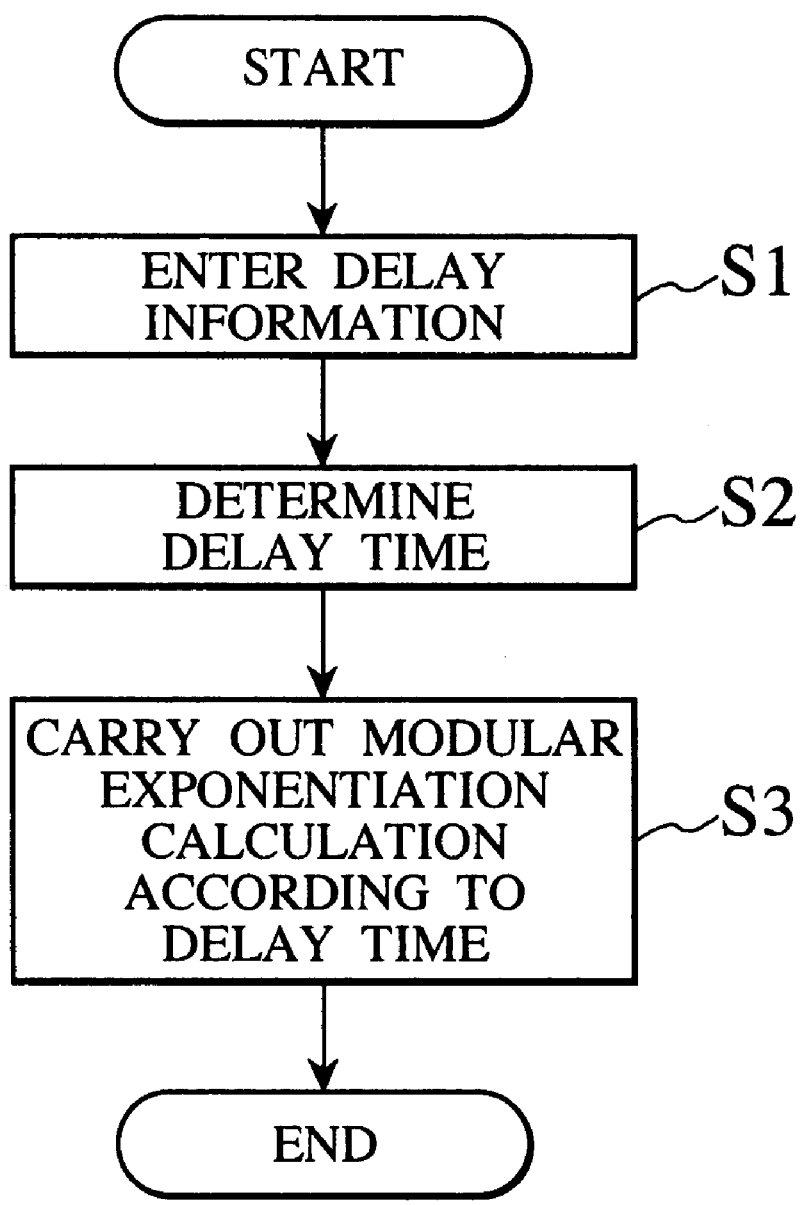
FIG. 6 is a flow chart for an outline of a scheme for calculating modular exponentiation according to the second embodiment of the present invention.

More specifically, according to this second embodiment, in the modular exponentiation calculation which is the basic operation of the public key cryptosystem, a delay time at a critical path due to transmission delay is varied for each modular exponentiation calculation, according to the procedure shown in FIG. 6.

Namely, a delay information for varying a processing time for modular exponentiation is entered (step S1), and a delay time is determined according to the entered delay information (step S2). Then, the modular exponentiation calculation is carried out while varying the delay time applied to the calculation according to the determined delay time (step S3).

In further detail, an initial value (seed) necessary for generating a random number is generated first, and a random number is generated according to the initial value, and then the delay time is generated according to the generated random number. At a time of generating the initial value to be used in the random number generation, a plurality of initial values can be generated and a random number can be generated from these plurality of initial values.

Figure 7:
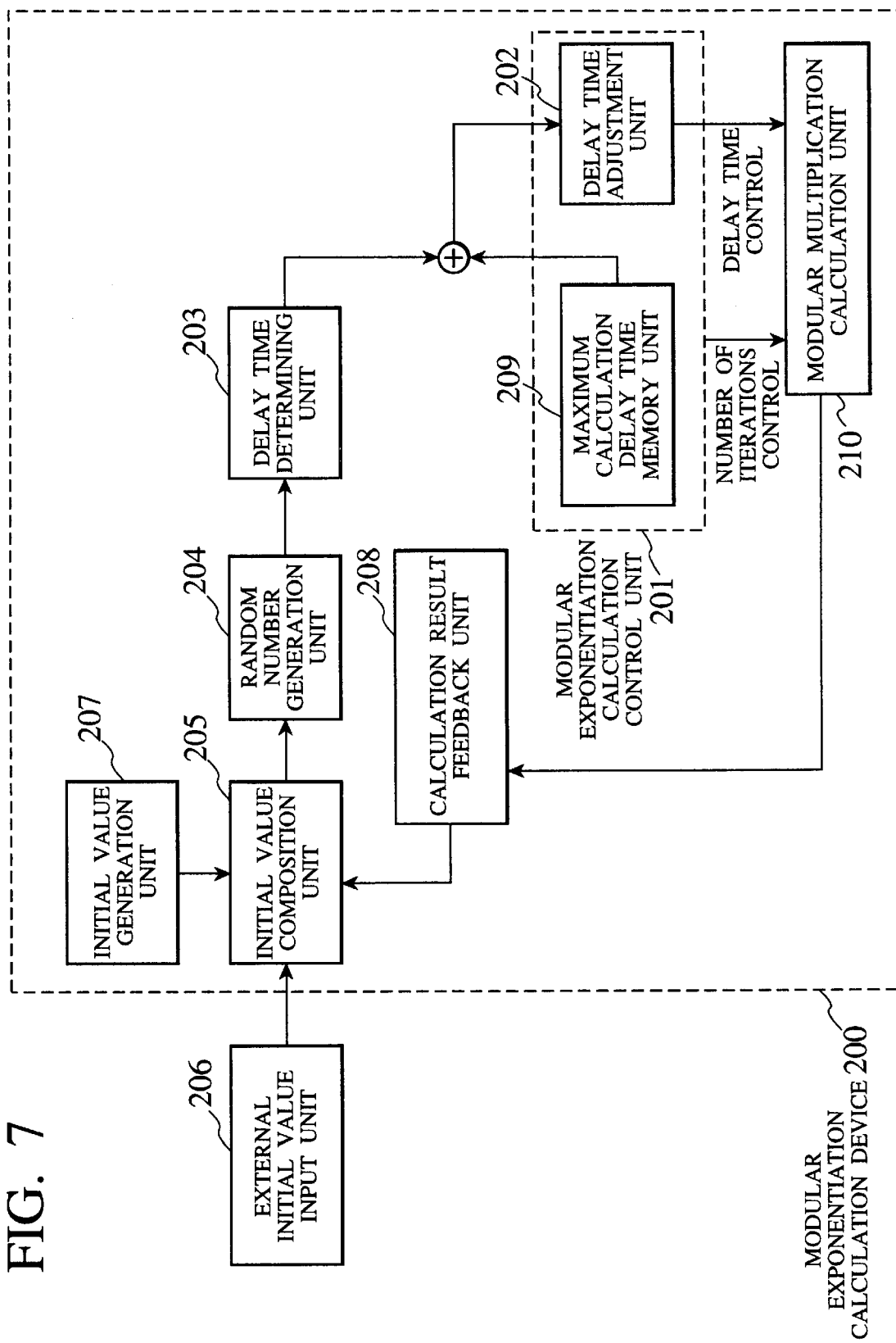
FIG. 7 is a block diagram of a modular exponentiation calculation device according to the second embodiment of the present invention.

FIG. 7 shows a configuration of a modular exponentiation calculation device 200 in this second embodiment, which comprises a modular exponentiation calculation control unit 201 including a delay time adjustment unit 202 and a maximum calculation delay time memory unit 209, a delay time determining unit 203, a random number generation unit 204, an initial value composition unit 205, an initial value generation unit 207, a calculation result feedback unit 208, and a modular multiplication calculation unit 210. The initial value composition unit 205 is also connected with an external initial value input unit 206.

The most hardware circuits constituting usual modular exponentiation calculation devices have a circuit for adjusting a delay time at a critical path due to transmission delay, and the usual design makes this delay time adjustment as small as possible. In contrast, in this second embodiment, the delay time by this delay time adjustment circuit is designed to be varied for each modular exponentiation calculation so that a calculation time becomes different even for modular exponentiation calculations using the same input.

In the modular exponentiation calculation device 200 of FIG. 7, modular exponentiation is calculated by iterating modular multiplication by the modular multiplication calculation unit 210, by the scheme of the first embodiment described above. Here, each modular multiplication requires a specific calculation time depending on a circuit design. This calculation time is stored and managed in the maximum calculation delay time memory unit 209 of the modular exponentiation calculation control unit 201. A delay time determined by the delay time determining unit 203 is then added to this specific calculation time of the modular multiplication calculation unit 210 to yield a virtual circuit delay time of the modular multiplication calculation, and the modular multiplication calculation unit 210 is controlled to carry out modular calculation in this virtual circuit delay time by the delay time adjustment unit 202 so as to make timing attacks difficult.

The random number generation unit 204 generates a random number which is to be used for the purpose of making the delay time determined by the delay time determining unit 203 random. This random number generated by the random number generation unit 204 is then given to the delay time determining unit 203. This random number generation unit 204 generates a random number according to initial value input. There are three possible ways of generating this initial value, as follows.

(1) A value entered from the external initial value input unit 206 can be taken as an initial value.

(2) A value generated by an initial value generation unit 207 can be taken as an initial value.

(3) A part or a whole (i.e. some bits or all bits) of the calculation result obtained by the modular multiplication calculation unit 210 as fed back by the calculation result feedback unit 208 can be taken as an initial value.

The initial value composition unit 205 can use the initial value given by any of the above (1), (2) and (3) singly, or in combination by composing values given by any of the above (1), (2) and (3) so as to generate a random number in better quality.

Figure 8:
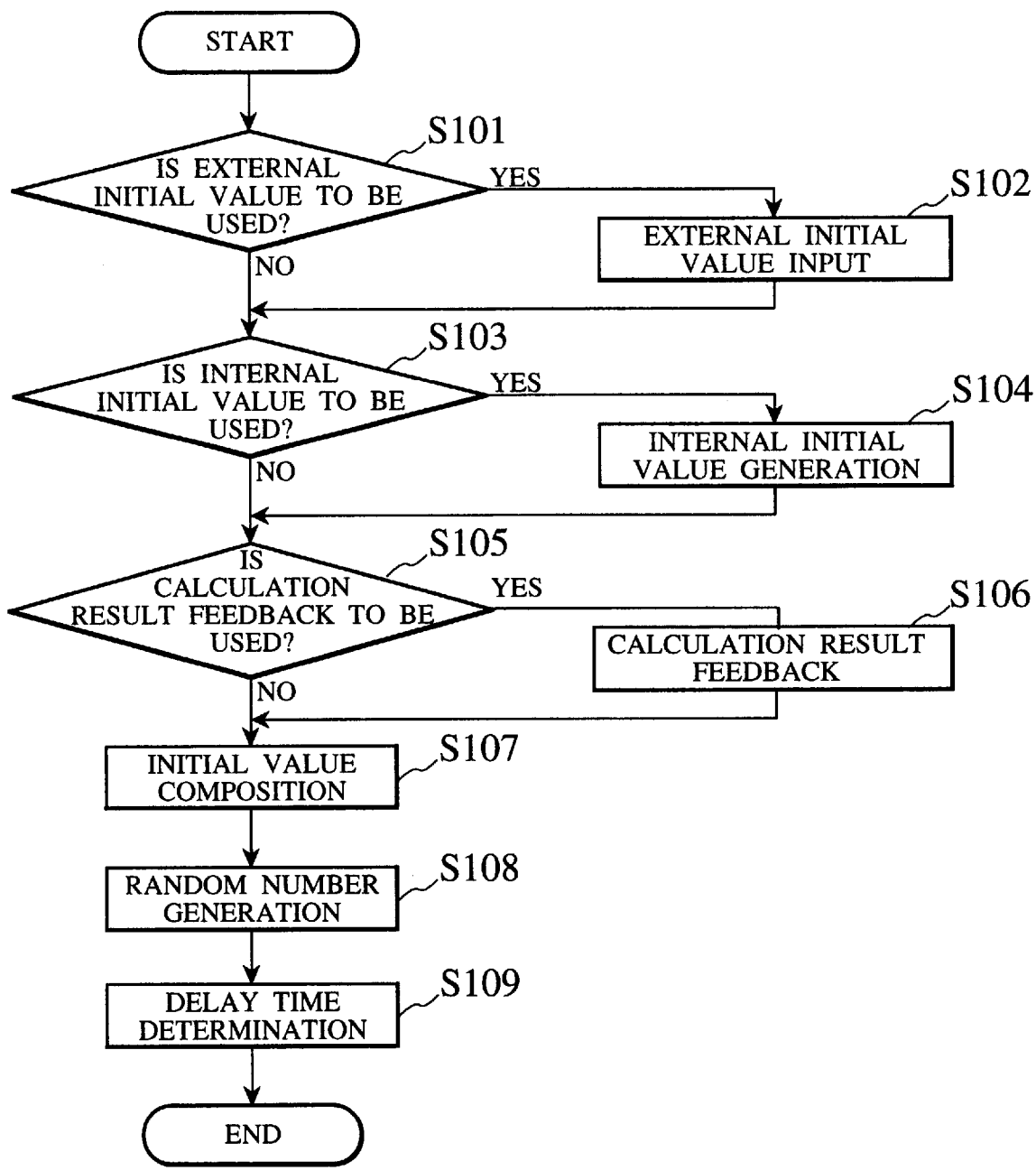
FIG. 8 is a flow chart of an operation to determine a delay time in the modular exponentiation calculation device of FIG. 7.

FIG. 8 shows a flow chart for the operation to determine the delay time in the modular exponentiation calculation device of FIG. 7, which proceeds as follows.

Step S101: First, the initial value composition unit 205 judges whether an external initial value input from the external initial value input unit 206 is to be used or not. If yes, the operation proceeds to the step S102, whereas otherwise the operation proceeds to the step S103.

Step S102: An external initial value for random generation is entered from the external initial value input unit 206, and this value is held in the initial value composition unit 205.

Step S103: Next, the initial value composition unit 205 judges whether an internal initial value generated by the initial value generation unit 207 is to be used or not. If yes, the operation proceeds to the step S104, whereas otherwise the operation proceeds to the step S105.

Step S104: An internal initial value for random generation is generated by the initial value generation unit 207, and this value is held in the initial value composition unit 205.

Step S105: Next, the initial value composition unit 205 judged whether the calculation result fed back by the calculation result feedback unit 208 is to be used or not. If yes, the operation proceeds to the step S106, whereas otherwise the operation proceeds to the step S107.

Step S106: A part or a whole of the calculation result obtained by the modular multiplication calculation unit 210 is fed back by the calculation result feedback unit 208, and this value is held in the initial value composition unit 205.

Step S107: The initial value composition unit 205 composes the initial value from any one or all of the values entered at the steps S102, S104 and S106. Here, a method of composing the initial value is not limited to any specific method in this second embodiment, and it suffices for the composed value to be a value that can be used as an initial value (seed) for a next random number generation. The initial value composition unit 205 then supplies the composed initial value to the random number generation unit 204.

Step S108: The random number generation unit 204 generates a random number from the initial value supplied from the initial value composition unit 205, and supplies the generated random number to the delay time determining unit 203.

Step S109: The delay time determining unit 203 determines the delay time from the supplied random number. The determined delay time is then added to the specific calculation time of the modular multiplication calculation unit 210 stored in the maximum calculation delay time memory unit 209 to yield the virtual circuit delay time of the modular multiplication calculation, which is then supplied to the delay time adjustment unit 202.

Note that, in the operation described above, the initial value composition unit 205 composes the initial value from values entered by any of the external initial value input unit 206, the initial value generation unit 207 and the calculation result feedback unit 208, but the initial value composition unit 205 may use a predetermined one of these initial value inputs alone, or all of these initial value inputs. It is also possible to change such a selection of the initial value inputs at a prescribed period. It is also possible to randomly activate any of the external initial value input unit 206, the initial value generation unit 207, and the calculation result feedback unit 208.

It is also to be noted that the second embodiment has been described above for a case of changing the calculation delay time for each modular exponentiation calculation, but since the modular exponentiation calculation is realized by iterating modular multiplication calculations, it is also possible to change the calculation delay time for each modular multiplication calculation constituting one modular exponentiation calculation. Since the timing attack becomes more difficult when the calculation delay time is changed more frequently, sequentially changing the calculation delay time for each modular multiplication calculation is more effective way for preventing the timing attack than iterating modular multiplication calculations with the same calculation delay time throughout one modular exponentiation calculation.

This sequential changing of the calculation delay time for each modular multiplication calculation can be realized by updating the initial value for random number generation during the modular exponentiation calculation, preferably every time the modular multiplication calculation is to be carried out. The updating of the initial value for random number generation can be realized by entering a new input from the external initial value input unit 206 or a part or a whole (i.e. some bits or all bits) of the previous calculation result obtained by the modular multiplication calculation unit 210 as fed back by the calculation result feedback unit 208, into the initial value composition unit 205 at suitable timings during one modular exponentiation calculation, preferably every time the modular multiplication calculation is to be carried out.

As described, according to this second embodiment, the delay time is varied for each modular exponentiation calculation to be used for a secret key calculation, even for cases of using exactly the same parameters, so that it becomes difficult to derive a secret key even if the calculation time is accurately measured and therefore it is possible to effectively prevent the highly dangerous timing attacks to the public key cryptosystems using modular exponentiation calculation.

In addition, this second embodiment is particularly effective when a dedicated processor which is not affected by the other processing is to be used for the modular exponentiation calculation.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the modular calculation device 100 of FIG. 1 and the modular exponentiation calculation device 200 of FIG. 7 can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for carrying out a basic operation of a public key cryptosystem using modular calculations based on a redundant binary calculation scheme, including a modular reduction a mod c where a is a dividend and c is a divisor, comprising the steps of:

(a) registering the dividend a and the divisor c in a dividend register and a divisor register, respectively;

(b) left shifting the divisor c in the divisor register by (i−j) digits when a number of digits j of the divisor c is less than a number of digits i that can be stored in the divisor register;

(c) calculating the modular reduction a mod c up to (i−j)-th decimal place using the dividend a in the dividend register and the divisor c in the divisor register as left shifted by the step (b), to obtain a remainder as a modular reduction result; and (d) carrying out the basic operation of the public key cryptosystem using the modular reduction result obtained by the step (c).

2. The method of claim 1, wherein the modular calculations are defined for binary numbers, and the step (c) calculates the modular reduction according to the redundant binary calculation scheme.

3. The method of claim 1, wherein the modular calculations also include a modular multiplication a×b mod c where a and b are dividends and c is a divisor, and the method further comprises the steps of:

(d) obtaining a first modular reduction result a'=a mod c using the steps (a), (b) and (c);

(e) obtaining a second modular reduction result b'=b mod c using the steps (a), (b) and (c); and (f) calculating the modular multiplication a'×b' mod c using a' obtained by the step (d) and b' obtained by the step (e), to obtain a modular multiplication result.

4. The method of claim 3, wherein the modular calculations also include a modular exponentiation $a^x$ mod c where a is a dividend, x is an exponent and c is a divisor, and the method further comprises the step of:

(g) calculating the modular exponentiation $a^x$ mod c by iterating the modular multiplication using the steps (d), (e) and (f).

5. The method of claim 4, wherein the modular exponentiation is used as the basic operation of the public key cryptosystem, which is to be carried out many times by a modular exponentiation calculation device, and the method further comprises the step of:

(h) varying a delay time at a critical path due to transmission delay in the modular exponentiation calculation device, at each time of calculating the modular exponentiation.

6. The method of claim 5, wherein the step (h) includes the steps of:

(h1) entering a delay information necessary for varying a calculation time of the modular exponentiation by the modular exponentiation calculation device;

(h2) determining the delay time according to the delay information entered at the step (h1); and (h3) controlling the modular exponentiation calculation device to carry out the step (g) according to the delay time determined by the step (h2), so as to vary the delay time at each time of calculating the modular exponentiation.

7. The method of claim 6, wherein the step (h1) includes the steps of:

(h11) generating an initial value necessary for generating a random number; and (h12) generating the random number from the initial value generated by the step (h11);
    wherein the step (h2) determines the delay time from the random number generated by the step (h12).

8. The method of claim 7, wherein the step (h11) generates the initial value from any one or combination of a plurality of input values including an internally generated input value, an externally entered input value, and a part or a whole of a previously obtained modular multiplication calculation result fed back from a previous iteration of the modular multiplication at the step (g).

9. The method of claim 7, wherein the step (h11) generates a new value for the initial value and the step (h12) generates a new value for the random number during calculation of the modular exponentiation at the step (g), so that the step (h2) determines a new value of the delay time during calculation of the modular exponentiation at the step (g), and the step (h3) controls the modular exponentiation calculation device to carry out the step (g) according to the new value of the delay time determined by the step (h2), so as to vary the delay time during calculation of the modular exponentiation at the step (g).

10. The method of claim 7, wherein the step (h11) generates a new value for the initial value and the step (h12) generates a new value for the random number at each time of iterating the modular multiplication at the step (g), so that the step (h2) determines a new value of the delay time at each time of iterating the modular multiplication at the step (g), and the step (h3) controls the modular exponentiation calculation device to carry out each modular multiplication at the step (g) according to the new value of the delay time determined by the step (h2), so as to vary the delay time at each time of calculating the modular multiplication.

11. A method for carrying out a basic operation of a public key cryptosystem using modular calculations based on a redundant binary calculation scheme, including a modular reduction a mod c where a is a dividend given in h-ary notation and c is a divisor given in h-ary notation, comprising the steps of:

(a) registering the dividend a and the divisor c in a dividend register and a divisor register, respectively;

(b) left shifting the divisor c in the divisor register by (i−j) digits when a number of digits j of the divisor c is less than a number of digits i that can be stored in the divisor register;

(c) left shifting the dividend a in the register by (k−l) digits when a number of digits l of the dividend a is less than a number of digits k that can be stored in the register, where $k \geq i$;

(d) calculating the modular reduction a mod c up to a digit of (k−l)−(i−j)-th power of h using the dividend a in the register as left shifted by the step (c) and the divisor c in the divisor register as left shifted by the step (b), to obtain a remainder;

(e) right shifting the remainder obtained by the step (d) by (k−l) digits, to obtain a modular reduction result; and (f) carrying out the basic operation of the public key cryptosystem using the modular reduction result obtained by the step (e).

12. The method of claim 11, wherein the modular calculations are defined for binary numbers, and the step (d) calculates the modular reduction according to the redundant binary calculation scheme.

13. The method of claim 11, wherein the modular calculations also include a modular multiplication a×b mod c where a and b are dividends and c is a divisor, and the method further comprises the steps of:

(f) obtaining a first modular reduction result a'=a mod c using the steps (a), (b), (c), (d) and (e);

(g) obtaining a second modular reduction result b'=b mod c using the steps (a), (b), (c), (d) and (e); and (h) calculating the modular multiplication a'×b' mod c using a' obtained by the step (f) and b' obtained by the step (g), to obtain a modular multiplication result.

14. The method of claim 13, wherein the modular calculations also include a modular exponentiation $a^x$ mod c where a is a dividend, x is an exponent and c is a divisor, and the method further comprises the step of:

(i) calculating the modular exponentiation $a^x$ mod c by iterating the modular multiplication using the steps (f), (g) and (h).

15. The method of claim 14, wherein the modular exponentiation is used as the basic operation of the public key cryptosystem, which is to be carried out many times by a modular exponentiation calculation device, and the method further the step of:

(j) varying a delay time at a critical path due to transmission delay in the modular exponentiation calculation device, at each time of calculating the modular exponentiation.

16. The method of claim 15, wherein the step (j) includes the steps of:

(j1) entering a delay information necessary for varying a calculation time of the modular exponentiation by the modular exponentiation calculation device;

(j2) determining the delay time according to the delay information entered at the step (j1); and (j3) controlling the modular exponentiation calculation device to carry out the step (i) according to the delay time determined by the step (j2), so as to vary the delay time at each time of calculating the modular exponentiation.

17. The method of claim 16, wherein the step (j1) includes the steps of:

(j11) generating an initial value necessary for generating a random number; and (j12) generating the random number from the initial value generated by the step (j11);

wherein the step (j2) determines the delay time from the random number generated by the step (j12).

18. The method of claim 17, wherein the step (j11) generates the initial value from any one or combination of a plurality of input values including an internally generated input value, an externally entered input value, and a part or a whole of a previously obtained modular multiplication calculation result fed back from a previous iteration of the modular multiplication at the step (g).

19. The method of claim 17, wherein the step (j11) generates a new value for the initial value and the step (j12) generates a new value for the random number during calculation of the modular exponentiation at the step (i), so that the step (j2) determines a new value of the delay time during calculation of the modular exponentiation at the step (i), and the step (j3) controls the modular exponentiation calculation device to carry out the step (i) according to the new value of the delay time determined by the step (j2), so as to vary the delay time during calculation of the modular exponentiation at the step (i).

20. The method of claim 17, wherein the step (j11) generates a new value for the initial value and the step (j12) generates a new value for the random number at each time of iterating the modular multiplication at the step (i), so that the step (j2) determines a new value of the delay time at each time of iterating the modular multiplication at the step (i), and the step (j3) controls the modular exponentiation calculation device to carry out each modular multiplication at the step (i) according to the new value of the delay time determined by the step (j2), so as to vary the delay time at each time of calculating the modular multiplication.

21. A method for carrying out a basic operation of a public key cryptosystem using modular calculations based on a redundant binary calculation scheme, including a modular multiplication a×b mod c where a and b are dividends and c is a divisor, the steps of:

(a) obtaining a first modular reduction a'=a mod c by:

(aa) registering the dividend a and the divisor c in a first dividend register and a second divisor register, respectively;

(ab) left shifting the divisor c in the first divisor register by (i−j) digits when a number of digits j of the divisor c is less than a number of digits i that can be stored in the first divisor register; and (ac) calculating the first modular reduction a'=a mod c up to (i−j)-th decimal place using the dividend a in the first dividend register and the divisor c in the first divisor register as left shifted by the step (ab), to obtain a remainder as a modular reduction result;

(b) obtaining a second modular reduction b'=b mod c by:

(ba) registering the dividend b and the divisor c given in h-ary notation in a second dividend register and a second divisor register, respectively;

(bb) left shifting the divisor c in the second divisor register by (m−n) digits when a number of digits n of the divisor c is less than a number of digits m that can be stored in the second divisor register;

(bc) left shifting the b in the second register by (k−l) digits when a number of digits l of the dividend b is less than a number of digits k that can be stored in the dividend register, where $k \geq m$;

(bd) calculating the second modular reduction a'=a mod c up to a digit of (k−l)−(m−n)-th power of h using the dividend b in the second dividend register as left shifted by the step (bc) and the divisor c in the second divisor register as left shifted by the step (bb), to obtain a remainder; and (be) right shifting the remainder obtained by the step (bd) by (k−l) digits, to obtain a modular reduction result;

(c) calculating a modular multiplication a'×b' mod c using a' obtained by the step (a) and b' obtained by the step (b), to obtain a modular multiplication result; and (d) carrying out the basic operation of the public key cryptosystem using the modular multiplication result obtained by the step (c).

22. A device for carrying out modular calculations based on a redundant binary calculation scheme, including a modular reduction a mod c where a is a dividend and c is a divisor, comprising:

a dividend register for registering the dividend a;

a divisor register for registering the divisor c;

a shifting unit for left shifting the divisor c in the divisor register by (i−j) digits when a number of digits j of the divisor c is less than a number of digits i that can be stored in the divisor register; and a calculation unit for calculating the modular reduction a mod c up to (i−j)-th decimal place using the dividend a in the dividend register and the divisor c in the divisor register as left shifted by the shifting unit, to obtain a remainder as a modular reduction result.

23. The device of claim 22, wherein the modular calculations are defined for binary numbers, and the calculation unit calculates the modular reduction according to the redundant binary calculation scheme.

24. The device of claim 22, wherein the modular calculations also include a modular multiplication a×b mod c where a and b are dividends and c is a divisor, and the calculation unit also calculates the modular multiplication by obtaining a first modular reduction result a'=a mod c, obtaining a second modular reduction result b'=b mod c, and calculating the modular multiplication a'×b' mod c to obtain a modular multiplication result.

25. The device of claim 24, wherein the modular calculations also include a modular exponentiation $a^x$ mod c where a is a dividend, x is an exponent and c is a divisor, and the calculation unit also calculates the modular exponentiation $a^x$ mod c by iterating the modular multiplication.

26. The device of claim 25, wherein the modular exponentiation is used as a basic operation of a public key cryptosystem, which is to be carried out many times by said device, and said device further comprises:

a calculation control unit for varying a delay time at a critical path due to transmission delay in said device, at each time of calculating the modular exponentiation.

27. The device of claim 26, wherein the calculation control unit includes:

an input unit for entering a delay information necessary for varying a calculation time of the modular exponentiation by said device;

a determining unit for determining the delay time according to the delay information entered by the input unit; and a control unit for controlling the calculation unit to calculate the modular exponentiation according to the delay time determined by the determining unit, so as to vary the delay time at each time of calculating the modular exponentiation.

28. The device of claim 27, wherein the input unit includes:

an initial value input unit for generating an initial value necessary for generating a random number; and a random number generation unit for generating the random number from the initial value generated by the initial value input unit;

wherein the determining unit determines the delay time from the random number generated by the random number generation unit.

29. The device of claim 28, wherein the initial value input unit generates the initial value from any one or combination of a plurality of input values including an internally generated input value, an externally entered input value, and a part or a whole of a previously obtained modular multiplication calculation result fed back from a previous iteration of the modular multiplication by the calculation unit.

30. The device of claim 28, wherein the initial value input unit generates a new value for the initial value and the random number generation unit generates a new value for the random number during calculation of the modular exponentiation by the calculation unit, so that the determining unit determines a new value of the delay time during calculation of the modular exponentiation by the calculation unit, and the control unit controls the calculation unit according to the new value of the delay time determined by the determining unit, so as to vary the delay time during calculation of the modular exponentiation by the calculation unit.

31. The device of claim 28, wherein the initial value input unit generates a new value for the initial value and the random number generation unit generates a new value for the random number at each time of iterating the modular multiplication by the calculation unit, so that the determining unit determines a new value of the delay time at each time of iterating the modular multiplication by the calculation unit, and the control unit controls each modular multiplication by the calculation unit according to the new value of the delay time determined by the determining unit, so as to vary the delay time at each time of calculating the modular multiplication by the calculation unit.

32. A device for carrying out modular calculations based on a redundant binary calculation scheme, including a modular reduction a mod c where a is a dividend given in h-ary notation and c is a divisor given in a h-ary notation, comprising:

a dividend register for registering the dividend a;

a divisor register for registering the divisor c;

a divisor shifting unit for left shifting the divisor c in the divisor register by (i−j) digits when a number of digits j of the divisor c is less than a number of digits i that can be stored in the divisor register;

a dividend shifting unit for left shifting the dividend a in the dividend register by (k−l) digits when a number of digits l of the dividend a is less than a number of digits k that can be stored in the dividend register, where $k \geq i$;

a calculation unit for calculating the modular reduction a mod c up to a digit of (k−l)−(i−j)-th power of h using the dividend a in the dividend register as left shifted by the dividend shifting unit and the divisor c in the divisor register as left shifted by the divisor shifting unit, to obtain a remainder; and a remainder shifting unit for right shifting the remainder obtained by the calculation unit by (k−l) digits, to obtain a modular reduction result.

33. The device of claim 32, wherein the modular calculations are defined for binary numbers, and the calculation unit calculates the modular reduction according to the redundant binary calculation scheme.

34. The device of claim 32, wherein the modular calculations also include a modular multiplication a×b mod c where a and b are dividends and c is a divisor, and the calculation unit also calculates the modular multiplication by obtaining a first modular reduction result a'=a mod c, obtaining a second modular reduction result b'=b mod c, and calculating the modular multiplication a'×b' mod c to obtain a modular multiplication result.

35. The device of claim 34, wherein the modular calculations also include a modular exponentiation $a^x$ mod c where a is a dividend, x is an exponent and c is a divisor, and the calculation unit also calculates the modular exponentiation $a^x$ mod c by iterating the modular multiplication.

36. The device of claim 35, wherein the modular exponentiation is used as a basic operation of a public key cryptosystem, which is to be carried out many times by said device, and said device further comprises:

a calculation control unit for varying a delay time at a critical path due to transmission delay in said device, at each time of calculating the modular exponentiation.

37. The device of claim 36, wherein the calculation control unit includes:

an input unit for entering a delay information necessary for varying a calculation time of the modular exponentiation by said device;

a determining unit for determining the delay time according to the delay information entered by the input unit; and a control unit for controlling the calculation unit to calculate the modular exponentiation according to the delay time determined by the determining unit, so as to vary the delay time at each time of calculating the modular exponentiation.

38. The device of claim 37, wherein the input unit includes:

an initial value input unit for generating an initial value necessary for generating a random number; and a random number generation unit for generating the random number from the initial value generated by the initial value input unit;

wherein the determining unit determines the delay time from the random number generated by the random number generation unit.

39. The device of claim 38, wherein the initial value input unit generates the initial value from any one or combination of a plurality of input values including an internally generated input value, an externally entered input value, and a part or a whole of a previously obtained modular multiplication calculation result fed back from a previous iteration of the modular multiplication by the calculation unit.

40. The device of claim 38, wherein the initial value input unit generates a new value for the initial value and the random number generation unit generates a new value for the random number during calculation of the modular exponentiation by the calculation unit, so that the determining unit determines a new value of the delay time during calculation of the modular exponentiation by the calculation unit, and the control unit controls the calculation unit according to the new value of the delay time determined by the determining unit, so as to vary the delay time during calculation of the modular exponentiation by the calculation unit.

41. The device of claim 38, wherein the initial value input unit generates a new value for the initial value and the random number generation unit generates a new value for the random number at each time of iterating the modular multiplication by the calculation unit, so that the determining unit determines a new value of the delay time at each time of iterating the modular multiplication by the calculation unit, and the control unit controls each modular multiplication by the calculation unit according to the new value of the delay time determined by the determining unit, so as to vary the delay time at each time of calculating the modular multiplication by the calculation unit.

42. A device for carrying out modular calculations based on a redundant binary calculation scheme, including a a modular multiplication a×b mod c where a and b are dividends and c is a divisor, comprising:

a first modular reduction calculation unit including:

a first dividend register for registering the dividend a;

a first divisor register for registering the divisor c;

a shifting unit for left shifting the divisor c in the first divisor register by (i−j) digits when a number of digits j of the divisor c is less than a number of digits i that can be stored in the first divisor register; and a first calculation unit for calculating a first modular reduction a'=a mod c up to (i−j)-th decimal place using the dividend a in the first dividend register and the divisor c in the first divisor register as left shifted by the shifting unit, to obtain a remainder as a modular reduction result;

a second modular reduction calculation unit including:

a second dividend register for registering the dividend b given in h-ary notation;

a second divisor register for registering the divisor c given in h-ary notation;

a divisor shifting unit for left shifting the divisor c in the second divisor register by (m−n) digits when a number of digits n of the divisor c is less than a number of digits m that can be stored in the second divisor register;

a dividend shifting unit for left shifting the dividend b in the second dividend register by (k−l) digits when a number of digits l of the dividend b is less than a number of digits k that can be stored in the second dividend register, where $k \geq m$;

a second calculation unit for calculating a second modular reduction b'=b mod c up to a digit of (k−l)−(m−n)-th power of h using the dividend b in the second dividend register as left shifted by the dividend shifting unit and the divisor c in the second divisor register as left shifted by the divisor shifting unit, to obtain a remainder; and a remainder shifting unit for right shifting the remainder obtained by the second calculation unit by (k−l) digits, to obtain a modular reduction result; and a modular multiplication calculation unit for calculating a modular multiplication a'×b' mod c to obtain a modular multiplication result.

43. An article of manufacture, comprising:

a computer usable medium having computer readable program code means embodied therein for causing a computer to function as a system for carrying out modular calculations based on a redundant binary calculation scheme, including a modular reduction a mod c where a is a dividend and c is a divisor, the computer readable program code means including:

first computer readable program code means for causing said computer to register the dividend a and the divisor c in a dividend register and a divisor register, respectively;

second computer readable program code means for causing said computer to left shift the divisor c in the divisor register by (i−j) digits when a number of digits j of the divisor c is less than a number of digits i that can be stored in the divisor register; and third computer readable program code means for causing said computer to calculate the modular reduction a mod c up to (i−j)-th decimal place using the dividend a in the dividend register and the divisor c in the divisor register as left shifted by the second computer readable program code means, to obtain a remainder as a modular reduction result.

44. The article of manufacture of claim 43, wherein the modular calculations are defined for binary numbers, and the third computer readable program code means calculates the modular reduction according to the redundant binary calculation scheme.

45. The article of manufacture of claim 43, wherein the modular calculations also include a modular multiplication a×b mod c where a and b are dividends and c is a divisor, and the third computer readable program code means also calculates the modular multiplication by obtaining a first modular reduction result a'=a mod c, obtaining a second modular reduction result b'=b mod c, and calculating the modular multiplication a'×b' mod c to obtain a modular multiplication result.

46. The article of manufacture of claim 45, wherein the modular calculations also include a modular exponentiation $a^x$ mod c where a is a dividend, x is an exponent and c is a divisor, and the third computer readable program code means also calculates the modular exponentiation $a^x$ mod c by iterating the modular multiplication.

47. The article of manufacture of claim 46, wherein the modular exponentiation is used as a basic operation of a public key cryptosystem, which is to be carried out many times by said system, and the computer readable program code means further includes:

fourth computer readable program code means for causing said computer to vary a delay time at a critical path due to transmission delay in said system, at each time of calculating the modular exponentiation.

48. The article of manufacture of claim 47, wherein the fourth computer readable program code means further includes:

fifth computer readable program code means for causing said computer to enter a delay information necessary for varying a calculation time of the modular exponentiation by said system;

sixth computer readable program code means for causing said computer to determine the delay time according to the delay information entered by the fifth computer readable program code means; and seventh computer readable program code means for causing said computer to control the third computer readable program code means to calculate the modular exponentiation according to the delay time determined by the sixth computer readable program code means, so as to vary the delay time at each time of calculating the modular exponentiation.

49. The article of manufacture of claim 48, wherein the fifth computer readable program code means further includes:

eighth computer readable program code means for causing said computer to generate an initial value necessary for generating a random number; and ninth computer readable program code means for causing said computer to generate the random number from the initial value generated by the eighth computer readable program code means;

wherein the sixth computer readable program code means determines the delay time from the random number generated by the ninth computer readable program code means.

50. The article of manufacture of claim 49, wherein the eighth computer readable program code means generates the initial value from any one or combination of a plurality of input values including an internally generated input value, an externally entered input value, and a part or a whole of a previously obtained modular multiplication calculation result fed back from a previous iteration of the modular multiplication by the third computer readable program code means.

51. The article of manufacture of claim 49, wherein the eighth computer readable program code means generates a new value for the initial value and the ninth computer readable program code means generates a new value for the random number during calculation of the modular exponentiation by the third computer readable program code means, so that the sixth computer readable program code means determines a new value of the delay time during calculation of the modular exponentiation by the third computer readable program code means, and the seventh computer readable program code means controls the third computer readable program code means according to the new value of the delay time determined by the sixth computer readable program code means, so as to vary the delay time during calculation of the modular exponentiation by the third computer readable program code means.

52. The article of manufacture of claim 49, wherein the eighth computer readable program code means generates a new value for the initial value and the ninth computer readable program code means generates a new value for the random number at each time of iterating the modular multiplication by the third computer readable program code means, so that the sixth computer readable program code means determines a new value of the delay time at each time of iterating the modular multiplication by the third computer readable program code means, and the seventh computer readable program code means controls each modular multiplication by the third computer readable program code means according to the new value of the delay time determined by the sixth computer readable program code means, so as to vary the delay time at each time of calculating the modular multiplication by the third computer readable program code means.

53. An article of manufacture, comprising:
a computer usable medium having computer readable program code means embodied therein for causing a computer to function as a system for carrying out modular calculations based on a redundant binary calculation scheme, including a modular reduction a mod c where a is a dividend given in h-ary notation and c is a divisor given in h-ary notation, the computer readable program code means including:
first computer readable program code means for causing said computer to register the dividend a and the divisor c in a dividend register and a divisor register, respectively;
second computer readable program code means for causing said computer to left shift the divisor c in the divisor register by (i−j) digits when a number of digits j of the divisor c is less than a number of digits i that can be stored in the divisor register;
third computer readable program code means for causing said computer to left shift the dividend a in the dividend register by (k−l) digits when a number of digits l of the dividend a is less than a number of digits k that can be stored in the dividend register, where k≧i;
fourth computer readable program code means for causing said computer to calculate the modular reduction a mod c up to a digit of (k−l)−(i−j)-th power of h using the dividend a in the dividend register as left shifted by the third computer readable program code means and the divisor c in the divisor register as left shifted by the second computer readable program code means, to obtain a remainder; and
fifth computer readable program code means for causing said computer to right shift the remainder obtained by the fourth computer readable program code means by (k−l) digits, to obtain a modular reduction result.

54. The article of manufacture of claim 53, wherein the modular calculations are defined for binary numbers, and the fourth computer readable program code means calculates the modular reduction according to the redundant binary calculation scheme.

55. The article of manufacture of claim 53, wherein the modular calculations also include a modular multiplication a×b mod c where a and b are dividends and c is a divisor, and the fourth computer readable program code means also calculates the modular multiplication by obtaining a first modular reduction result a'=a mod c, obtaining a second modular reduction result b'=b mod c, and calculating the modular multiplication a'×b' mod c to obtain a modular multiplication result.

56. The article of manufacture of claim 55, wherein the modular calculations also include a modular exponentiation $a^x$ mod c where a is a dividend, x is an exponent and c is a divisor, and the fourth computer readable program code means also calculates the modular exponentiation $a^x$ mod c by iterating the modular multiplication.

57. The article of manufacture of claim 56, wherein the modular exponentiation is used as a basic operation of a public key cryptosystem, which is to be carried out many times by said system, and the computer readable program code means further includes:
sixth computer readable program code means for causing said computer to vary a delay time at a critical path due to transmission delay in said system, at each time of calculating the modular exponentiation.

58. The article of manufacture of claim 57, wherein the sixth computer readable program code means further includes:
seventh computer readable program code means for causing said computer to enter a delay information necessary for varying a calculation time of the modular exponentiation by said system;
eighth computer readable program code means for causing said computer to determine the delay time according to the delay information entered by the seventh computer readable program code means; and
ninth computer readable program code means for causing said computer to control the fourth computer readable program code means to calculate the modular exponentiation according to the delay time determined by the eighth computer readable program code means, so as to vary the delay time at each time of calculating the modular exponentiation.

59. The article of manufacture of claim 58, wherein the seventh computer readable program code means further includes:
tenth computer readable program code means for causing said computer to generate an initial value necessary for generating a random number; and
eleventh computer readable program code means for causing said computer to generate the random number from the initial value generated by the tenth computer readable program code means;
wherein the eighth computer readable program code means determines the delay time from the random number generated by the eleventh computer readable program code means.

60. The article of manufacture of claim 59, wherein the tenth computer readable program code means generates the initial value from any one or combination of a plurality of input values including an internally generated input value, an externally entered input value, and a part or a whole of a previously obtained modular multiplication calculation result fed back from a previous iteration of the modular multiplication by the fourth computer readable program code means.

61. The article of manufacture of claim 59, wherein the tenth computer readable program code means generates a new value for the initial value and the eleventh computer readable program code means generates a new value for the random number during calculation of the modular exponentiation by the fourth computer readable program code means, so that the eighth computer readable program code means determines a new value of the delay time during calculation of the modular exponentiation by the fourth computer readable program code means, and the ninth computer readable program code means controls the fourth computer readable program code means according to the new value of the delay time determined by the eighth computer readable program code means, so as to vary the delay time during calculation of the modular exponentiation by the fourth computer readable program code means.

62. The article of manufacture of claim 59, wherein the tenth computer readable program code means generates a new value for the initial value and the eleventh computer readable program code means generates a new value for the random number at each time of iterating the modular multiplication by the fourth computer readable program code means, so that the eighth computer readable program code means determines a new value of the delay time at each time of iterating the modular multiplication by the fourth computer readable program code means, and the ninth computer readable program code means controls each modular multiplication by the fourth computer readable program code means according to the new value of the delay time determined by the eighth computer readable program code means, so as to vary the delay time at each time of calculating the modular multiplication by the fourth computer readable program code means.

63. An article of manufacture, comprising:

a computer usable medium having computer readable program code means embodied therein for causing a computer to function as a system for carrying out modular calculations based on a redundant binary calculation scheme, including a modular multiplication a×b mod c where a and b are dividends and c is a divisor, the computer readable program code means including:

a first computer readable program code means for causing said computer to obtain a first modular reduction a'=a mod c by: registering the dividend a and the divisor c in a first dividend register and a first divisor register, respectively; left shifting the divisor c in the first divisor register by (i−j) digits when a number of digits j of the divisor c is less than a number of digits i that can be stored in the first divisor register; and calculating a first modular reduction a mod c up to (i−j)-th decimal place using the dividend a in the first dividend register and the divisor c in the first divisor register as left shifted, to obtain a remainder as a modular reduction result;

a second computer readable program code means for causing said computer to obtain a second modular reduction by: registering the dividend b and the divisor c given in h-ary notation in a second dividend register and a second divisor register, respectively; left shifting the divisor c in the second divisor register by (m−n) digits when a number of digits n of the divisor c is less than a number of digits m that can be stored in the second divisor register; left shifting the dividend b in the second dividend register by (k−l) digits when a number of digits l of the dividend a is less than a number of digits k that can be stored in the second dividend register, where k≧m; calculating a second modular reduction b'=b mod c up to a digit of (k−l)−(m−n)-th power of h using the dividend b in the second dividend register as left shifted and the divisor c in the second divisor register as left shifted, to obtain a remainder; and right shifting the remainder by (k−l) digits, to obtain a modular reduction result; and a third computer readable program code means for causing said computer to calculate a modular multiplication a'×b' mod c to obtain a modular multiplication result.

* * * * *